United States Patent [19]
Willis

[11] Patent Number: 5,531,563
[45] Date of Patent: Jul. 2, 1996

[54] TRAY SADDLE ARRANGEMENT FOR AUTOMATED PRODUCT HANDLING SYSTEM

[75] Inventor: Robert N. Willis, Dothan, Ala.

[73] Assignees: Sony Corporation, Japan; Sony Electronics, Inc., Park Ridge, N.J.

[21] Appl. No.: 228,430

[22] Filed: Apr. 15, 1994

[51] Int. Cl.⁶ ................................................. B65H 29/56
[52] U.S. Cl. .......................................... 414/794.3; 198/388
[58] Field of Search ............................. 414/789.9, 793.4, 414/794.3, 795.8; 271/189; 198/465.1, 346.1, 388; 220/23.6

[56] References Cited

U.S. PATENT DOCUMENTS

| | | | |
|---|---|---|---|
| 2,768,756 | 10/1956 | Horman | 414/794.3 |
| 2,896,809 | 7/1959 | Metzger et al. | 220/23.6 |
| 3,197,058 | 7/1965 | Hale | 220/23.6 |
| 4,279,354 | 7/1981 | Conti | 220/23.6 |
| 4,522,301 | 6/1985 | Ajmera | 220/23.6 |
| 4,618,069 | 10/1986 | Quong | 220/23.6 |
| 4,642,013 | 2/1987 | Mundus et al. | 414/794.3 |
| 4,711,356 | 12/1987 | Dunden | 220/23.6 |
| 4,712,361 | 12/1987 | Oberoi | 414/789.9 |
| 5,096,367 | 3/1992 | Winski | 414/796.8 |
| 5,203,445 | 4/1993 | Shiraiwa | 198/346.1 |

FOREIGN PATENT DOCUMENTS 2184080  6/1987  United Kingdom ................. 198/388

*Primary Examiner*—Karen B. Merritt
*Assistant Examiner*—Douglas Hess
*Attorney, Agent, or Firm*—Ronald P. Kananen

[57] ABSTRACT

In order to prevent stacks of containers from shifting under the influence of vibration produced by an automated product handling system and assuming positions wherein jamming/mishandling is apt to occur, a container saddle ad stopper arrangement is provided on one or more of the platforms on which the container stacks are received and arranged to engage in recesses formed in the underside of the containers in a manner which ensures that the lowermost trays assume the required orientation and position on the platform.

7 Claims, 5 Drawing Sheets

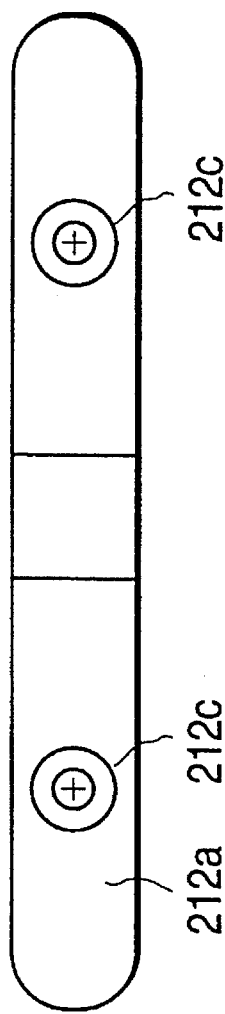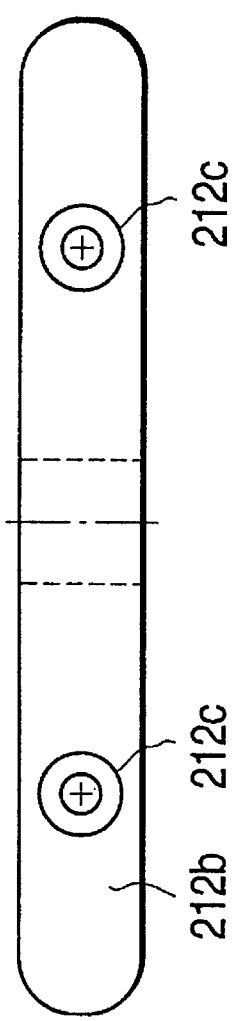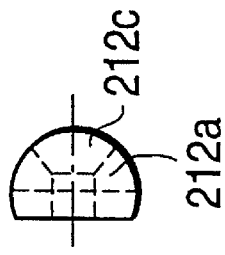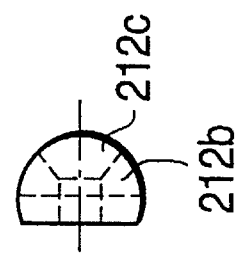

5,531,563

TRAY SADDLE ARRANGEMENT FOR AUTOMATED PRODUCT HANDLING SYSTEM

BACKGROUND OF THE INVENTION

1. Field of the Invention

The present invention relates generally to an automated product handling system. More specifically, the present invention relates to a product handling system which includes a conveyor arrangement that is equipped with a tray saddle and stopper arrangement which facilitates appropriate location and orientation of a stack of trays on a platform which forms part of the conveyor system.

2. Description of the Relevant Art

In the past, in automated product handling equipment wherein stacks of trays are positioned in a so-called "stacker" and then picked up by a tray shuttle and moved to another stage/operation, problems have been encountered in that trays tend to move undesirably around on the surfaces on which they are supported due to equipment vibration. This leads to a drawback in that stacks of trays tend to become jammed in the shuttle from time to time and leads to reductions in efficiency and yield as a result of machine downtime and scrap production.

SUMMARY OF THE INVENTION

It is an object of the present invention to provide a tray saddle arrangement which is simple and effective and which ensures that a stack of trays which pass through an automated conveyor system are correctly positioned and oriented.

It is a further object of the present invention to provide a tray saddle arrangement which can prevent trays from moving, under the influence of vibration and the like produced by the conveyor machinery, to positions wherein jamming and the like can take place.

In brief, an embodiment of the present invention consists of two metal backstops and one cross-piece of white nylon. The cross-piece can be constructed of two interlocking rods of roundstock which are formed with countersunk screw holes in each end. With this construction, the trays ride into the tray elevator under conveyor assistance and stop against the two metal backstops attached to the elevator platform. The platform has a base to which the nylon cross-piece is centrally mounted and which sits below two runners on which the trays are supported. When the tray stack hits the metal backstops, the platform with the cross-piece rises up underneath the bottom tray and slides into a shaped recess formed in a lower surface of the bottom tray. The stack of trays thus becomes positioned and held in a desired position with a desired orientation as they slide down onto the cross-piece saddle arrangement.

More specifically, a first aspect of the present invention resides in an automated product handling system comprising: conveyor means for moving a stack of trays along a predetermined path; a platform at an end of the predetermined path on which the stack of trays can be received; and tray saddle means on the platform for locating the stack of trays in a predetermined position and orientation on the platform.

A second aspect of the present invention resides in a method of handling a stack of trays comprising the steps of: transporting a stack of trays to a first end of a first conveyor line; loading the stack of trays onto a tray elevator by moving the stack of trays coming from the conveyor line and over a vertically movable base member; stopping horizontal motion of the stack of trays using stoppers in a manner which locates the stack of trays in a predetermined relationship with respect to the vertically movable base member; raising the vertically movable base toward the stack of trays; engaging a tray saddle secured to the vertically movable base with the lower surface of the lower tray of the stack of trays in a manner which locates and orients the stack of trays in a predetermined position and a predetermined direction, respectively; and moving the stack of trays from the predetermined position to a position wherein the stack of trays can be subjected to a predetermined operation.

Another aspect of the present invention resides in an apparatus for handling a stack of trays comprising: means for transporting a stack of trays to a first end of a first conveyor line; means for loading the stack of trays onto an elevator by moving the stack of trays off the conveyor line and over a vertically movable base member; stoppers for stopping horizontal motion of the stack of trays in a manner which locates the stack of trays in a predetermined relationship with respect to the vertically movable base member; a tray saddle which is secured to the vertically movable base for engaging the lower surface of the lower tray of the stack of containers in a manner which locates and orients the stack of trays in a predetermined position and a predetermined direction with respect to the base member, respectively; and means for moving the stack of trays from the predetermined position to a position wherein the stack of containers can be subject to a predetermined operation.

A further aspect of the invention resides in an automated handling system comprising: filling and stacking means for filling containers with articles of manufacture and stacking the containers into stacks; a plurality of conveyor lines arranged in a predetermined relationship with the filling and stacking means; shuttle means for moving the stacks of containers between a selected one of the conveyor lines and the filling and stacking means, the shuttle means including an elevator platform; a vertically movable base member which forms part of the elevator platform; a container saddle secured to the upper surface of the vertically movable base member; and stopper means arranged with respect to the container saddle means so as to abut a stack of containers and locate the stack so that upon vertical displacement of the vertically movable base member, the container saddle engages with the lower surface of the lower container of the stack of containers and causes the stack to be oriented and positioned in a predetermined manner.

BRIEF DESCRIPTION OF THE DRAWINGS

The various features and advantages of the present invention will become more clearly appreciated as a description is made with reference to the appended drawings in which:

FIGS. 8 to 11 are views showing details of members which can be used in the construction of a tray saddle according to a preferred embodiment of the present invention.

DETAILED DESCRIPTION OF THE PREFERRED EMBODIMENTS

Figure 1:
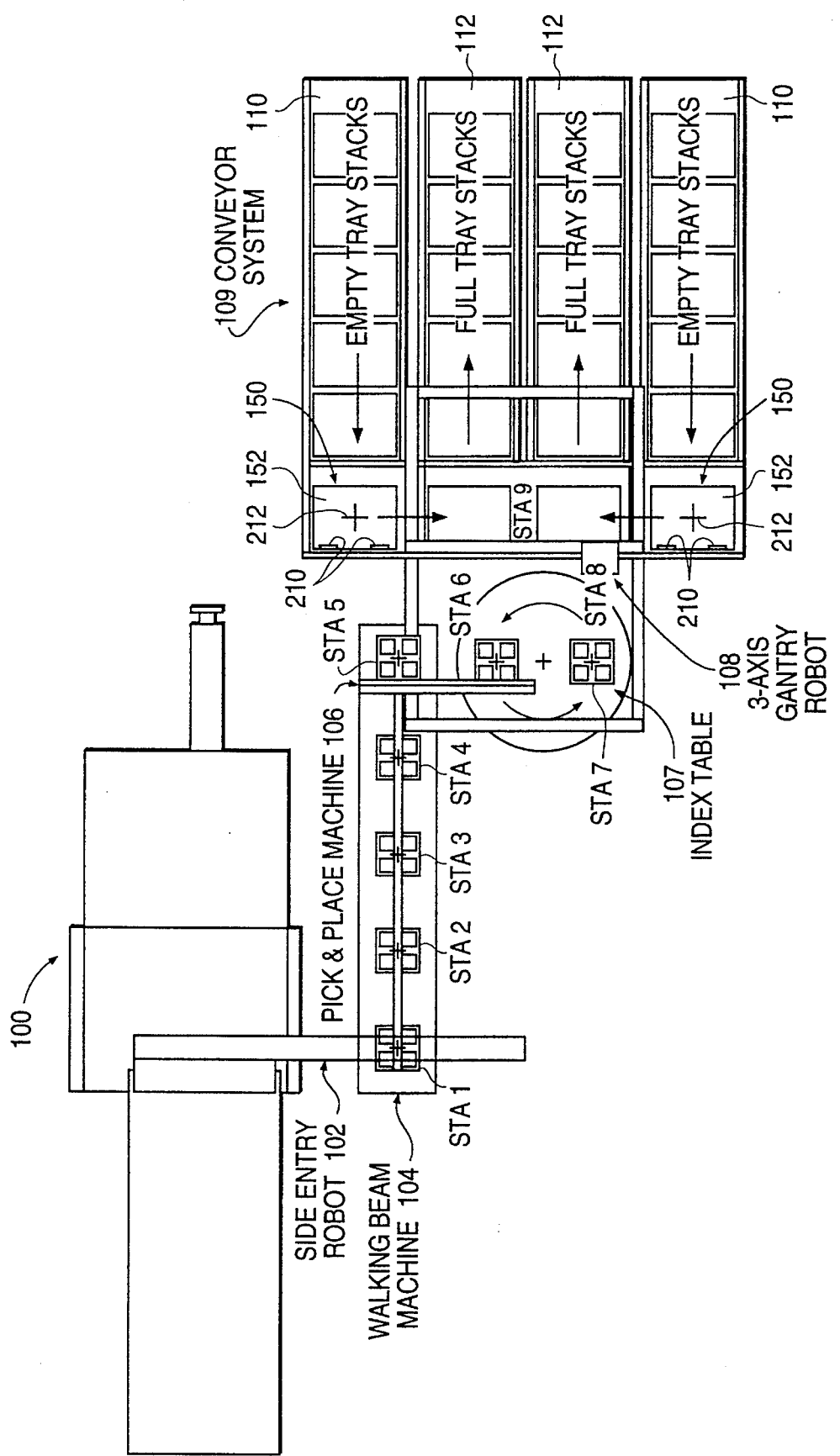
FIG. 1 is a schematic plan view of a conveyor system to which the present invention is applied.
Figure 2:
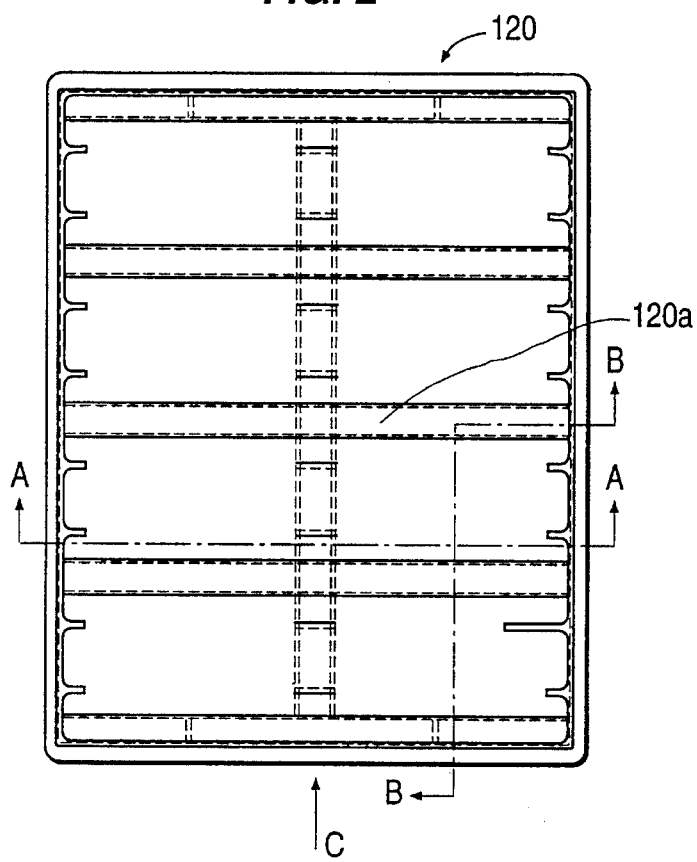
FIG. 2 is a plan view of a tray which can be used in accordance with a preferred embodiment of the present invention.
Figure 4:
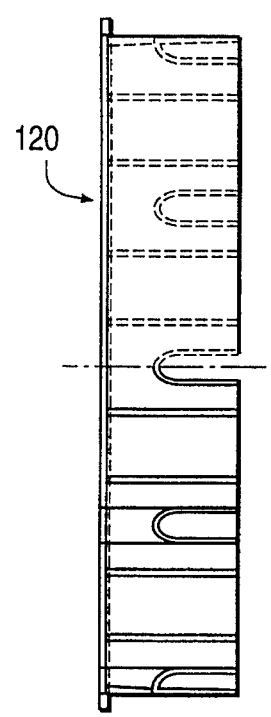
FIG. 4 is a sectional view as taken along section line B—B of FIG. 2.
Figure 3:
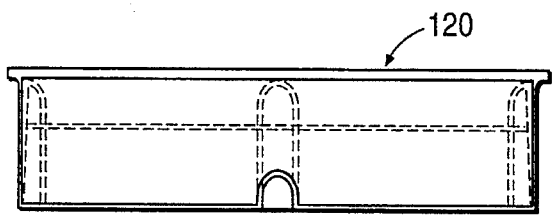
FIG. 3 is a sectional view as taken along section line A—A of FIG. 2.
Figure 5:
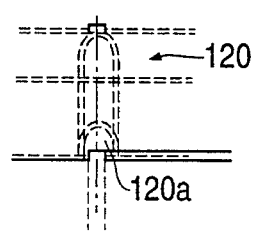
FIG. 5 is an end view of the tray shown in FIG. 2 as seen in the direction of arrow C.

FIG. 1 is a schematic plan view of an automated product handling system to which the present invention is applicable. This system is of the type that includes a molding machine 100 which is arranged with a side entry robot 102 so that articles, such as microfloppy discs or the like which are produced by the molding machine, are transferred from the molding machine 100 to a walking beam machine 104 by way of the side entry robot 102. In this case, the walking beam machine 104 comprises stations 1 to 4. Merely by way of example, the first of these stations (STATION 1) is arranged to receive the articles from the molding machine 100, STATION 2 and STATION 3 are used for quality control inspection, and STATION 4 is arranged to handle rejects which did not pass the QC (quality control) inspection.

An overhead pick and place machine 106 is arranged with the walking beam machine 104 and is such as to include stations 5 to 9. In this case, STATION 5 is arranged so that parts (molded articles) are unloaded from the walking beam machine 104 by the overhead pick and place device 106. STATION 6 is such that the parts are dropped into tubes and "down stacking" is controlled by a stepper motor and ball screw down feed follower (not shown) which prevents the parts from flipping over. Stacks of sixty articles per stack can be produced if so desired. The stacking tubes which are used in this process are located on an index table 107 which is capable of rotating through 180 degrees. The loaded tubes are rotated to STATION 7 wherein they assume unloading positions.

At STATION 8, a three-axis gantry robot 108 grips the stacks of sixty parts in the tubes, lifts each stack, rotates the stacks to assume a horizontal position, and places the stacks in a tray. After each tray is filled, it is placed in a stack and when a stack of a predetermined number of trays (e.g. 10 trays) is compiled, the stack is shuttled to a full tray stack accumulation station (STATION 9).

As shown in FIG. 1, the conveyor system 109 is arranged to have a plurality of conveyor lines 110, 112, which respectively transport empty and full stacks of trays to and from STATION 9. As will be further appreciated from FIG. 1, it is necessary to move or shuttle each stack of empty trays laterally with respect to the direction of transfer by the empty tray conveyors 110 before the trays are positioned to be picked up by a robotic arrangement and moved to a site wherein they can be robotically unstacked, filled and restacked. In this environment, in order to achieve this lateral displacement of the stacks from one position to another, it is necessary that each stack of trays is properly located and oriented. That is to say, if the stacks are not correctly placed and oriented, the robotic arrangement which is used, is apt to mishandle the stacks and lead to jamming and the like type of problems.

Figure 6:
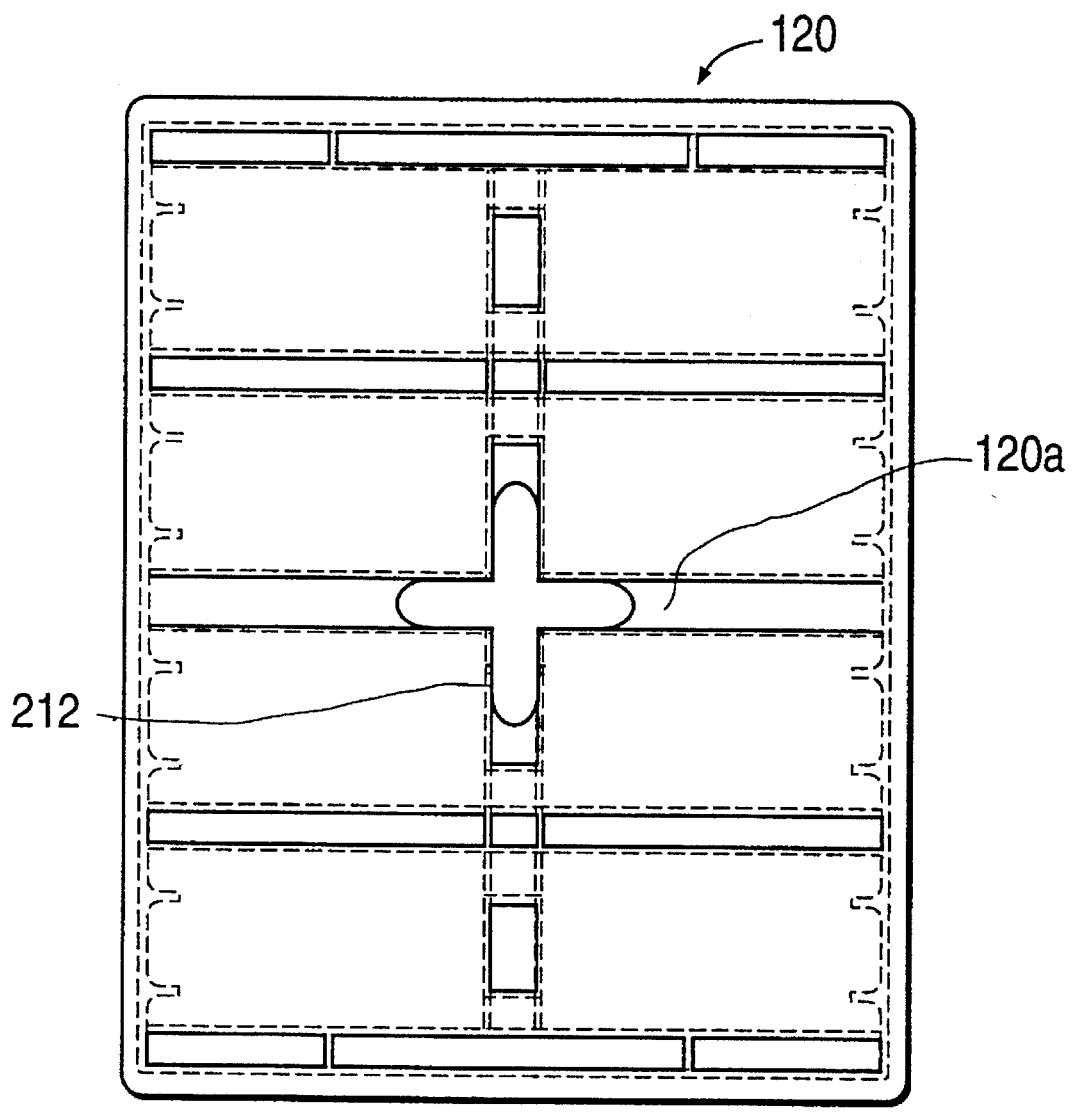
FIG. 6 is a bottom view showing the lower surface of the tray and the position on this lower surface in which the tray saddle according to the preferred embodiment of the present invention, is arranged to seat.
Figure 7:
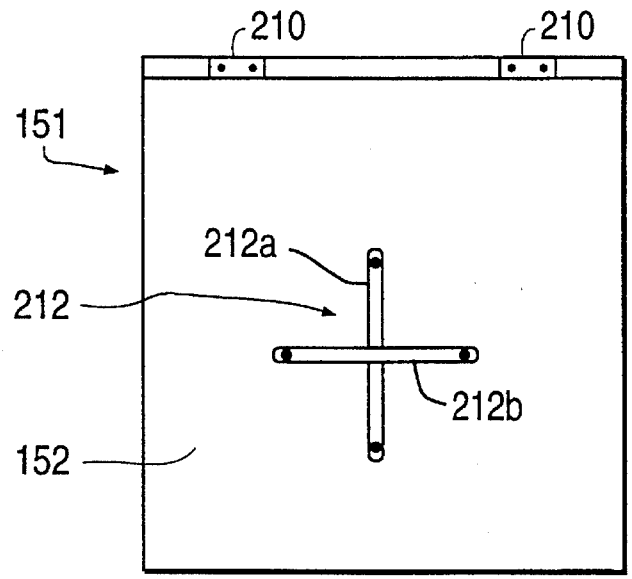
FIG. 7 is plan view of a platform used in the arrangement shown in FIG. 1 and which is equipped with the tray saddle according to a preferred embodiment of the present invention.

Thus, in accordance with the present invention, as seen in FIGS. 6 and 7, a tray saddle arrangement is provided on each of the elevator platforms 151 which are located at the ends of the empty tray stack conveyors 110. In this embodiment, the arrangement, as shown in FIG. 7, includes two metal backstops or stoppers 210 which are attached to an edge portion of the elevator platform 151, and a cross-piece 212 made of white nylon by way of example, which is secured to the upper surface of a vertically movable base 152 of the platform.

With this arrangement, as each stack of empty trays rides into an empty tray elevator 150 on a pair of rails or runners (not shown), the lowermost tray engages the backstops 210 and stops in a position wherein the base member 152 on which the cross-piece 212 is secured, can be raised so that the bottom tray of the stack which has a predetermined shaped recess in its lower surfaces, is smoothly engaged by the rising cross-piece 212. The tray stacks accordingly become both properly positioned and oriented as the cross-piece 212 slides into and becomes fully received in the recess of the bottom tray.

With this positioning and orientation, the intended operation at this stage of the robotic or automated handling system is assured.

FIGS. 2 through 6 show details of a tray 120 which can be used with the above described tray saddle arrangement. Although the present invention is not limited to this particular type of tray design, it will be appreciated that the lower surface of the trays must have a shaped recess or some arrangement into which the saddle can fit and induce the required orienting and positioning effect. Inherently, the trays must be such as to fit one on top of one another in a manner wherein the integrity and stability of the stack is assured. While it is possible for the shaped recesses in the lower surface of the trays to be used to achieve the required interlocking and alignment of the stacked trays, it is not essential to the present invention that such actually be the case. FIG. 6 shows a cross-channel type recess 120a cooperating with a cross-piece type tray saddle 212.

FIGS. 8 to 11 show details of the construction of the cross-piece 212 mentioned above. As will be appreciated from these drawings, the cross-piece 212 can be readily formed of two pieces of rod 212a, 212b which are interleaved with one another and secured in place by means of self-tapping screws or the like which are disposed through bores 212c.

Figure 12:
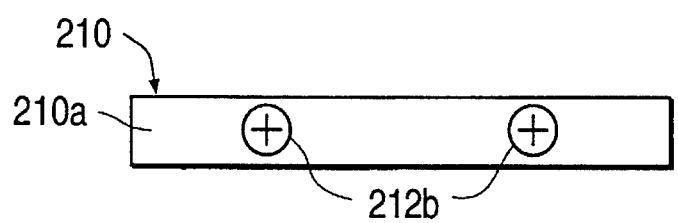
FIGS. 12 and 13 are views showing constructional details of a stopper which forms part of the preferred embodiment of the present invention.
Figure 13:
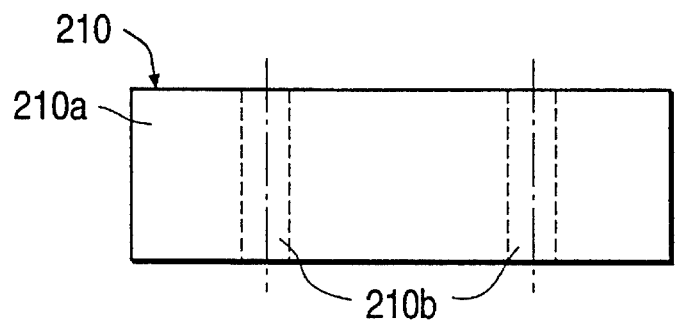

FIGS. 12 and 13 show details of one of the two stoppers or backstops 210 which are used in accordance with the preferred embodiment of the present invention. As will be appreciated from these drawings, these stoppers can be simple rectangular blocks 210a of metal which are drilled out to form bores 210b through which connecting bolts can be disposed.

Although the present invention has been described with reference to only one specific embodiment, it will be appreciated that the present invention is not confined to this particular construction/arrangement and is limited only by the appended claims.

What is claimed is:

1. An automated product handling system comprising:
   a stack of trays wherein at least a bottom tray of said stack is formed with a predetermined shaped recess in a lower surface thereof;

conveyor means for moving said stack of trays along a predetermined path;

a platform at an end of said predetermined path on which said stack of trays can be received;

tray saddle means on said platform for locating said stack of trays in a predetermined position and orientation on said platform, said tray saddle means being arranged to be received in said predetermined shaped recess; and stopper means mounted on said platform for engaging said stack of trays and for limiting relative movement between said stack of trays and said platform and for positioning said stack of trays so that said tray saddle means is substantially aligned with said recess.

2. An automated product handling system as set forth in claim 1, wherein said stack of trays comprises a plurality of substantially identical trays.

3. An automated product handling system as set forth in claim 1, wherein said tray saddle means comprises a cross-shaped member which is secured to an upper surface of said platform.

4. An automated product handling system as set forth in claim 3, wherein said stopper means comprises a plurality of backstops which are fastened to an edge portion of said platform in a predetermined spaced relationship with said cross-shaped member.

5. A method of handling a stack of trays comprising the steps of:

transporting a stack of trays to a first end of a first conveyor line;

loading said stack of trays onto a first tray elevator by moving the stack of trays from said conveyor line and over a vertically movable base member;

stopping horizontal motion of said stack of trays using stoppers which are connected to said vertically movable base member in a manner which locates said stack of trays in a predetermined relationship with respect to said vertically movable base member;

raising said vertically movable base member;

engaging a tray saddle which is secured to said vertically movable base member, with a lower surface of a lower tray of said stack of trays in a manner which locates and orients said stack of trays in a predetermined position and a predetermined direction with respect to said vertically movable base member, respectively; and moving said stack of trays from said predetermined position to a position wherein said stack of trays are subjected to a predetermined operation.

6. An apparatus for handling a stack of trays comprising:

means for transporting a stack of trays to a first end of a first conveyor line;

means for loading said stack of trays onto a first tray elevator by moving the stack of trays off said conveyor line and over a vertically movable base member;

stoppers on said vertically movable base member for stopping horizontal motion of said stack of trays in a manner which locates said stack of trays in a predetermined relationship with respect to said vertically movable base member;

a tray saddle which is secured to said vertically movable base, for engaging a lower surface of a lower tray of said stack of trays in a manner which locates and orients said stack of trays in a predetermined position and a predetermined direction with respect to said vertically movable base, respectively; and means for moving said stack of trays from said predetermined position to a position wherein said stack of trays can be subject to a predetermined operation.

7. An automated handling system comprising:

stack of containers arranged so that each can be filled with articles of manufacture;

filling and stacking means for filling the containers with the articles of manufacture and stacking the containers into said stack;

a plurality of conveyor lines arranged in a predetermined relationship with said filling and stacking means;

shuttle means for moving said stack of containers between a selected one of said conveyor lines and said filling and stacking means, said shuttle means including an elevator platform;

a vertically movable base member which forms part of said elevator platform;

a container saddle secured to the upper surface of said vertically movable base member; and stopper means secured to the said vertically movable base member and arranged with respect to said container saddle means so as to abut said stack of containers and locate said stack so that upon vertical displacement of said vertically movable base member, said container saddle engages with the lower surface of a lowest container of said stack and causes said stack to be oriented and positioned in a predetermined manner.

* * * * *